June 10, 1952 R. H. MARCHAL ET AL 2,599,851
PROCESS FOR MOVING FLUID, PARTICULARLY FOR LUBRICATION
OF INTERNAL-COMBUSTION ENGINE PISTONS
Filed Feb. 16, 1948
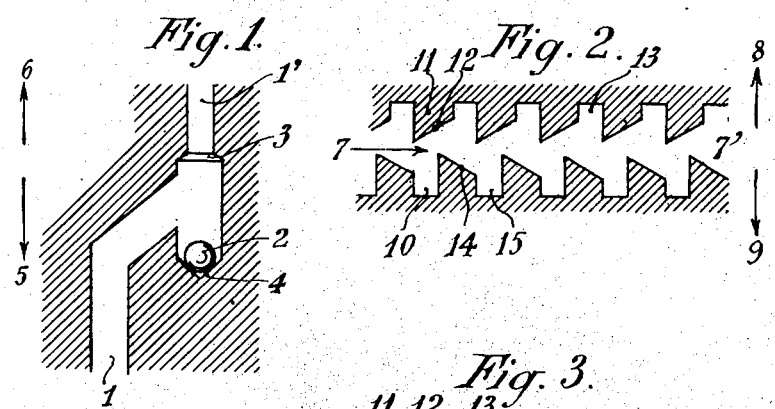
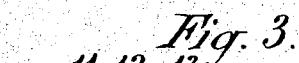
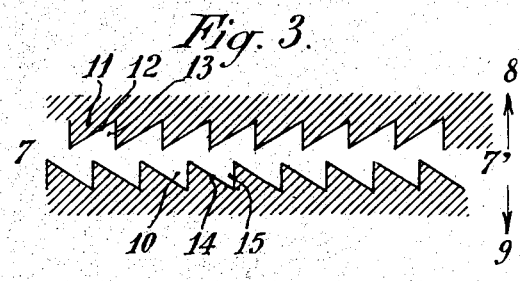
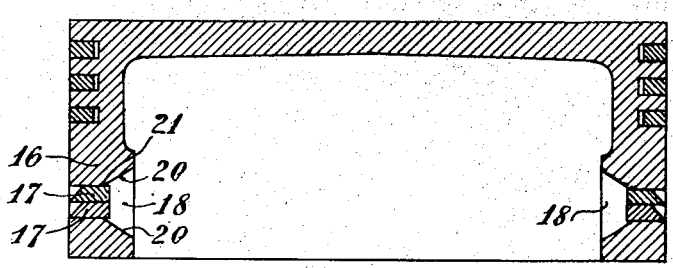
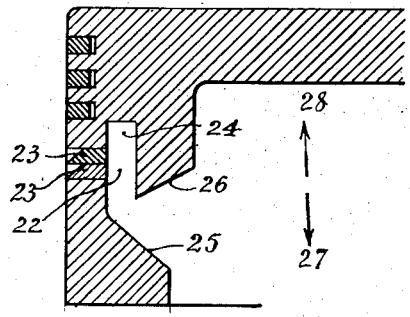
INVENTOR
R. H. Marchal +
O. Y. Duronsilaux
By Watson, Cole, Grindle + Watson Patented June 10, 1952

2,599,851

UNITED STATES PATENT OFFICE 2,599,851

PROCESS FOR MOVING FLUID, PARTICULARLY FOR LUBRICATION OF INTERNAL-COMBUSTION ENGINE PISTONS

Raymond H. Marchal and Olivier Y. Durouchoux, Paris, France, assignors to Societe Nationale d'Etude et de Construction de Moteurs d'Aviation, Paris, France, a company of France Application February 16, 1948, Serial No. 8,622 In France July 24, 1941

Section 1, Public Law 690, August 8, 1946
Patent expires July 24, 1961

1 Claim. (Cl. 309—7)

This invention relates to a process for moving fluids through members effecting alternating periodic displacements. It is applicable particularly but not exclusively for moving lubricating oil. It is susceptible of numerous uses particularly with supercharger or internal combustion engine pistons. In the latter case, it has for an object to lower oil consumption by improving efficiency of oil scraping piston rings.

A main object of this invention is to employ alternating inertia forces as set up in an alternating periodic movement, for causing a strong flow of fluid, in a particular case, lubricating oil, by providing passages suitably arranged for this purpose in order that no particular supply of energy is required for their operation.

Particularly in the last named application the supply of oil to points to be lubricated will be improved and the oil supply mechanism will be simplified. Also oil heated or polluted in lubricating will be removed quite simply.

This invention essentially comprises laying out fluid movement paths in such a manner that fluid movement in one direction takes place easily, but cannot take place or simply is difficult in the opposite direction. The periodic inertia forces which urge the fluid alternately in one direction and the opposite direction thus cause ample movements of the fluid in the favourable direction and small movements if any in the defavourable direction. The average general movement is obtained thereby.

The invention will now be set forth in connection with the following description of an example of construction, reference being had to the appended drawings in which:

Fig. 1 shows a first example wherein general movement of fluid takes place substantially in parallel relationship with the component of inertia forces in use.

Fig. 2 illustrates a second example in which general movement of fluid takes place substantially at right angles to the component of inertia forces in use.

Fig. 3 shows a modification of the construction illustrated in Fig. 2.

Figs. 4 and 5 show lubricating devices for engine and supercharger pistons, according to this invention.

Each figure has only for its purpose to enable the arrangement of means to be understood without showing construction details.

Referring to Fig. 1, the fluid travels through an elbow passage 1, 1' containing a ball adapted to move between a seat 3 therefor and an abutment 4. Should the reciprocating inertia forces have a component along general direction of passage 1, 1', ball 2 will be pushed against abutment 4 when the component is in the direction of arrow 5, and the fluid urged by inertia will move in the direction from 1' to 1. On the contrary, when the component along 1—1' of inertia forces is in the direction of arrow 6, ball 2 will stop seat 3 and any back movement of oil in the direction from 1 to 1' will be prevented.

It will be obvious that any other inertia responsive device such as poppet valve, clap valve and other valve may be substituted for ball 2, seat 3 and abutment 4, without departing from the scope of the present invention.

Referring to Fig. 2, a fluid moves in a passage 7—7' comprising successive recesses separated by partitions having a suitable shape, the upper face of which is oblique with respect to the main component of alternating inertia forces on use.

Let us assume that fluid has gathered in recess 10, the main component of inertia forces being at the time in the direction of arrow 9. When the said direction is reversed along arrow 8, fluid is forced out of recess 10 and strikes partition 11 the lower face 12 of which is oblique with respect to the direction 8 of inertia force. The fluid thus flows into recess 13. Upon further reversal of inertia force into the direction 9, the fluid likewise moves out of recess 13 and is driven into recess 15 through the oblique face 15.

As a result of such elemental movements of fluid, a general displacement in the direction 7—7' takes place, substantially at right angles to the general direction of the main component of alternating inertia forces.

It will be obvious that the number of recesses and oblique faces depends on the more or less long path along which fluid should be moved. The number may be as small as one in certain cases.

Fig. 3 illustrates a modification of the cross-section, the same reference characters being employed to denote members playing the same part as those bearing the same reference characters on Fig. 2.

It will be obvious that any other shape in section with employment of faces obliquely disposed relatively to the main direction of alternating inertia forces for automatically driving fluid may be devised without departing from the spirit of this invention.

A particular but not restrictive instance of application has for an object to improve operation of oil scraping rings on engine and supercharger pistons by employing inertia forces as set up in such a piston, so as to prevent any scraped-off oil from again contacting the ring or building up any counter-pressure along the same.

Fig. 4 is a cross-section wherein 16 denotes a piston body, 17 a ring or rings and 18 an aperture for discharging oil into the piston body. Such apertures are inwardly flaring so that alternating inertia forces as set up in operation drive oil into the piston body according to this invention.

The position of point 21 from which the aperture 18 flares inwardly may be adjusted with regard to a more or less strong effect being desired. In particular, point 21 may be located as shown on Fig. 4 in order that rings 17 protrude into the flaring portion of aperture 18.

Fig. 5 illustrates an example in which oil, instead of being discharged directly and freely into the piston body, is caused to be conveyed through a passage 22 bored in the piston body.

Oblique inclines 25 and 26 are provided for this purpose, to remove oil according to the invention, as it is scraped off by rings 23, through inertia forces parallel with the axis of the cylinder in which the piston reciprocates.

In this instance, a recess 24 plays a part analogous to that of recesses 10, 13 and 15 (Figs. 2 and 3). If the volume of recess 24 is sufficient for storing all oil scraped by rings 23 through the period in which the inertia forces are parallel with direction 28, the oil level will never reach the base of rings 23, and consequently the operation of said rings will never be interfered with by any counter-pressure. As a matter of fact, upon reversal of direction of inertia forces, recess 24 will be emptied and any oil scraped off by rings will be discharged along path 22—25 in the direction of arrow 27.

It is thus possible according to the present invention to provide for a permanent removal of oil scraped by rings without need for returning it directly into the oil pan.

What we claim is:

In a reciprocating piston which comprises a hollow body having a gas exposed top part and a cylindrical skirt provided with a circular groove in its outer surface and with a recess, within its wall, extending substantially parallel to the axis of said cylindrical skirt, the bottom of said recess being located between said groove and said top part of said piston, an oil scraping ring fitted in said groove, an oil conveying connection between said groove and an intermediate part of said recess, and a further oil conveying connection between the end of said recess remote from said top part and the hollow portion of said body, said last-mentioned connection having an inwardly directed deflecting wall opposite the bottom of said recess, said deflecting wall making an obtuse angle with the adjacent wall of said recess.

RAYMOND H. MARCHAL.
OLIVIER Y. DUROUCHOUX.

REFERENCES CITED

The following references are of record in the file of this patent:

UNITED STATES PATENTS

| Number | Name | Date |
|---|---|---|
| 1,259,292 | Riedler | Mar. 12, 1918 |
| 1,576,377 | Spencer | Mar. 9, 1926 |
| 1,796,792 | Johnson | Mar. 17, 1931 |
| 1,911,735 | Wilkening | May 30, 1933 |
| 2,078,394 | Luthy | Apr. 27, 1937 |
| 2,166,857 | Bugatti | July 18, 1939 |
| 2,410,895 | Nampa | Nov. 12, 1946 |